W. S. HOLLAND.
SPRING WHEEL.
APPLICATION FILED JULY 20, 1918.
1,286,634.
Patented Dec. 3, 1918.
2 SHEETS—SHEET 2.
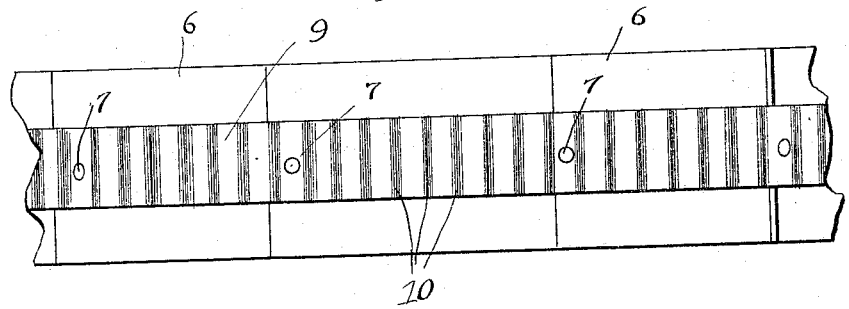
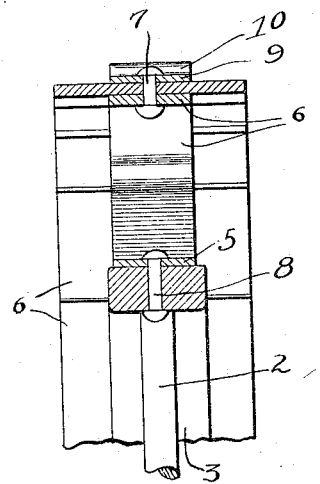
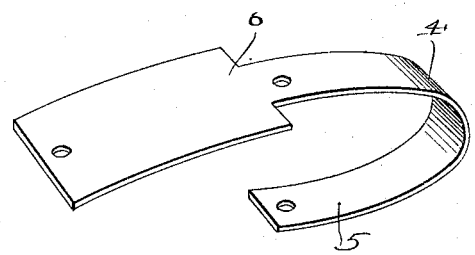
Witnesses
R. A. Thomas
J. W. Garner
Inventor
William S. Holland.
By Victor J. Evans
Attorney

UNITED STATES PATENT OFFICE.

WILLIAM STEPHEN HOLLAND, OF BEDFORD, VIRGINIA.

SPRING-WHEEL.

1,286,634.   Specification of Letters Patent.   Patented Dec. 3, 1918.

Application filed July 20, 1918. Serial No. 245,950.

*To all whom it may concern:*

Be it known that I, WILLIAM S. HOLLAND, a citizen of the United States, residing at Bedford, in the county of Bedford and State of Virginia, have invented new and useful Improvements in Spring-Wheels, of which the following is a specification.

This invention is an improved spring wheel for use on automobiles and other vehicles, the object of the invention being to provide an improved wheel of this kind which enables the use of a pneumatic tire to be entirely dispensed with, and which serves to absorb shocks, is strong and durable, and is not likely to get out of order.

With the above and other objects in view, the invention consists in the construction, combination and arrangement of devices hereinafter described and claimed.

In the accompanying drawings:

Fig. 2 is a detail plan of the same.

Fig. 3 is a detail transverse sectional view of the same.

Fig. 4 is a detail perspective view of one of the U-shaped springs.

Figure 1:
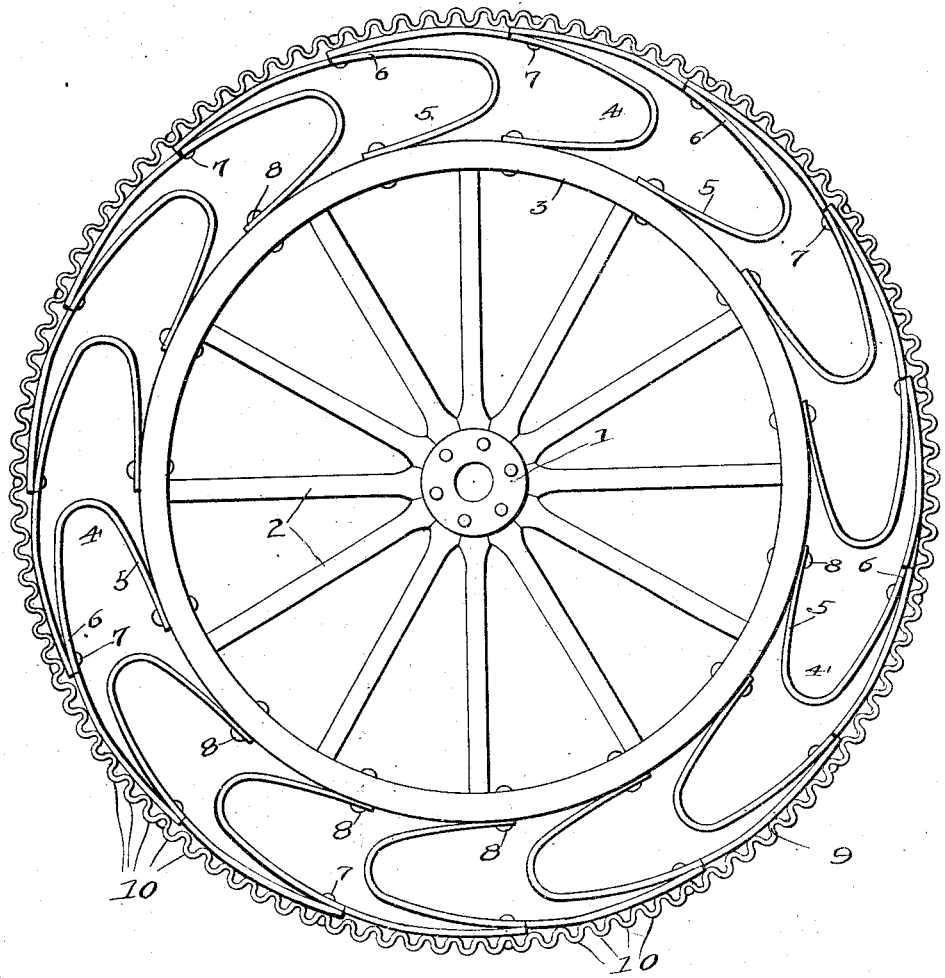
Figure 1 is a side elevation of a spring wheel constructed and arranged in accordance with my invention.

In the embodiment of the invention, here shown, there is provided a hub 1, spokes 2, and a felly 3. The felly is made of steel.

I also provide a series of curved, substantially U-shaped springs 4 each of which comprises a short inner arm 5 and a long outer arm 6. The outer arm is widened and the outer end of each outer arm bears on the narrowed portion of the outer arm of the next adjacent spring and is secured thereto by means of a rivet 7. Each inner arm is secured by a rivet 8 to the felly 3.

I also provide a tire 9 which is arranged on the central portions of the broadened outer arms of the springs and is secured thereto by the rivets 7, the broadened outer arms of the springs being wider than the tire. The tire is made of steel and is transversely corrugated as at 10 to give tractive force to the wheel and to prevent the same from skidding. Ordinarily the broadened outer ends of the outer arms of the springs are out of contact with the road surface but where the road is soft the tire sinks into the road surface and the broadened outer ends of the outer arms of the springs come in contact with road surface and provide a widened tread for the wheel, as will be understood.

The same rivets which secure the outer arms of the springs together in overlapping relation also secure the tire thereon. The rivets which are employed to secure the springs and the tire are not liable to work loose or become displaced and hence durability of the wheel is greatly enhanced and the necessity for repairs is minimized.

While I have herein shown and described a preferred embodiment of my invention, I would have it understood that changes may be made in the form, proportion and construction of the several parts without departing from the spirit of my invention and within the scope of the appended claim.

Having thus described my invention, I claim:

In a spring wheel, a felly, substantially U-shaped springs each having a short inner arm and a long outer arm, said inner arms being secured on the felly, said outer arms of the springs being arranged in partially overlapping relation, a tire on the outer arms of the springs and fastening devices securing said outer arms of the springs and the tire together, the said outer arms of the springs having broadened outer portions of greater width than the tire, the broadened outer portion of the outer arm of each spring being arranged in overlapping relation to the narrowed portion of the outer arm of the next adjacent spring.

In testimony whereof I affix my signature.

WILLIAM STEPHEN HOLLAND.

Copies of this patent may be obtained for five cents each, by addressing the "Commissioner of Patents, Washington, D. C."